United States Patent [19]

Kitamura

[11] Patent Number: 5,664,461
[45] Date of Patent: Sep. 9, 1997

[54] LENGTH-ADJUSTING DEVICE FOR CONTROL CABLE

[75] Inventor: Yoshiharu Kitamura, Aikawa-machi, Japan

[73] Assignees: NHK Spring Co., Ltd., Yokohama; Uni Flex, Inc., Ina, both of Japan

[21] Appl. No.: 597,860

[22] Filed: Feb. 7, 1996

Related U.S. Application Data

[63] Continuation of Ser. No. 145,251, Oct. 29, 1993, abandoned.

[30] Foreign Application Priority Data

Oct. 31, 1992 [JP] Japan ................................. 4-315997

[51] Int. Cl.⁶ ....................................................... F16C 1/10
[52] U.S. Cl. .................. 74/502.4; 74/502.6; 74/501.5 R
[58] Field of Search .......................... 74/500.5, 501.5 R, 74/502, 502.4, 502.6

[56] References Cited

U.S. PATENT DOCUMENTS

| | | | |
|---|---|---|---|
| 4,676,119 | 6/1987 | Spease | 74/501 R |
| 4,841,806 | 6/1989 | Spease | 74/501.5 R |
| 4,903,541 | 2/1990 | Shiota | 74/501.5 R |
| 5,163,338 | 11/1992 | Sharp et al. | 74/500.5 X |
| 5,178,034 | 1/1993 | Reasoner | 74/501.5 R |
| 5,207,116 | 5/1993 | Sultze | 403/104 X |
| 5,261,293 | 11/1993 | Kelley | 74/502.4 X |
| 5,295,408 | 3/1994 | Nagle et al. | 74/502.6 |
| 5,383,377 | 1/1995 | Boike | 74/502 |

FOREIGN PATENT DOCUMENTS

| | | | |
|---|---|---|---|
| 0244067 | 11/1987 | European Pat. Off. | 74/502.6 |
| 0481588 | 4/1992 | European Pat. Off. | 74/502.6 |
| 51-10269 | 3/1976 | Japan | 74/501.5 R |
| 62-63212 | 3/1987 | Japan | 74/501.5 R |

*Primary Examiner*—Vinh T. Luong
*Attorney, Agent, or Firm*—Lacenbach Siegel Marzullo Aronson & Greenspan, P.C.

[57] ABSTRACT

A length-adjusting device for a control cable which can securely be locked by a onetouch operation and is easily assembled. The device comprises an adjusting pipe, to which an outer cable is fixed with an inner cable passing therethrough, and on the outside of which are formed engaging teeth perpendicular to the axis thereof. A base member movably supports the adjusting pipe lengthwise; and an adjusting piece, is inserted into and spring-biasedly installed to said base member. A locking piece, having locking teeth engage the engaging teeth for locking the axial movement of the adjusting pipe, when fixed into the base member, and the device functioning so as to release the locking teeth from the engaging teeth due to movement of the adjusting piece.

2 Claims, 5 Drawing Sheets

F I G. 8
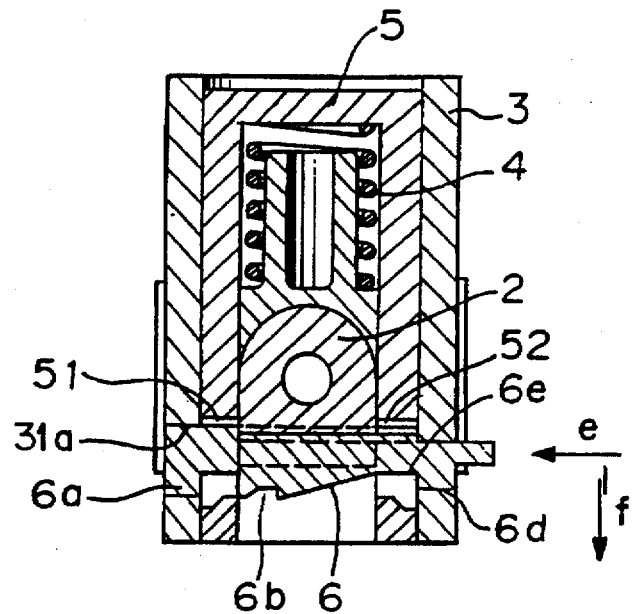
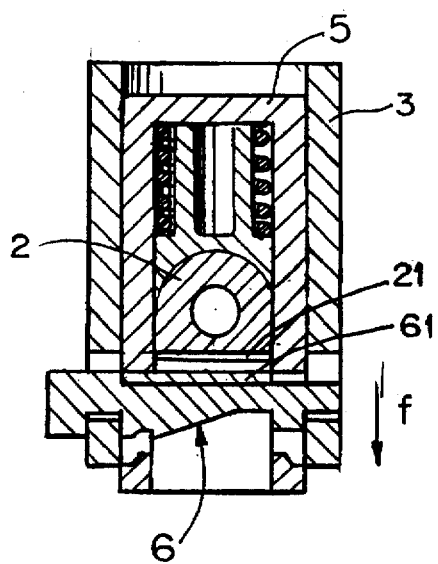
F I G. 9

LENGTH-ADJUSTING DEVICE FOR CONTROL CABLE

This application is a continuation, of application Ser. No. 08/145,251, filed Oct. 29, 1993 abandoned.

BACKGROUND (FIELD) OF THE INVENTION

The present invention relates to a length-adjusting device for a control cable to be used for automobiles or the like.

DESCRIPTION OF THE PRIOR ART

Heretofore, such a device as shown in FIG. 7 has been generally used for such a purpose. The device shown in FIG. 7 comprises an inner cable (a motion transmitting core element) 120, which is inserted through an outer cable (a sheath) 121, at the end of which an adjusting bolt (122) is secured, said adjusting bolt 122 being inserted into a fixing hole of a stationary member 123, and fixed by means of screwing two adjusting nuts 124 which are engaged with said adjusting bolt 122, from both sides of said stationary member 123 together. In order to adjust the cable length in such a device, however, said adjusting nuts 124 must be loosened first, then fastened again after adjusting the cable length, which is both troublesome and time-consuming.

Devices such as Japanese Publication S62-63212 (Type 1) and Japanese Utility Model Publication S51-10269 (Type 2) have been disclosed for overcoming such deficiencies.

Namely, in Type 1, a latch member is movably installed rectangular to said inner cable axis and spring-biased to latch with a sliding member integral to said inner cable. Cable length can be adjusted by moving the latch member against the resilient force of the spring; then, the inner cable can be locked by securing the latch member to the sliding member due to release from said enforced movement.

In Type 2, an adjusting device comprises an outer cable (a conduit), an adjusting pipe, to which said outer cable is fixed, and, through which an inner cable is penetrating, a base member (a support member) into which is inserted axial movably by said adjusting pipe, and an adjusting piece (a locking member) installed within the base member so as to slide rectangularly in the axial direction. Further, said locking member is threaded so as to engage with the outer thread of said adjusting pipe. Thus, said locking member comprises a small-diameter circular hole to be threaded as aforementioned, and a large-diameter circular hole to be continuously connected with said small one.

However, in Type 1, the size of the adjusting member inevitably becomes large, and moreover, secure locking cannot be achieved, because the latching direction is rectangular to said sliding member. Further, when touched by a third person, the adjusting piece may easily move resulting in impaired safety while driving an automobile.

In Type 2, furthermore, the formation of two types of holes, i.e., small- and large-diameter ones, will inevitably enlarge the size of the locking member and, since the adjusting pipe is moved relative to the two types of holes, the operational stroke of said locking member must be large, which results in its being unusable within a comparatively small space. Moreover, such a screw-threaded engagement may occasionally result in an adverse function or other trouble.

SUMMARY OF THE INVENTION

The present invention aims to provide an easily-assembled length-adjusting device for a control cable which is able to be so securely locked, by means of one-touch and small stroke operation, that no third person can release the lock inadvertently.

For attaining these features, the present device comprises:

an adjusting pipe, to which an outer cable (a sheath) is firmly attached, having an inner cable (a motion-transmitting core) passed therethrough, the pipe having engaging teeth, formed rectangular to the axis and outside thereof, a base member which supports the adjusting pipe movably along the axis, prohibiting rotation of the same, an adjusting piece, inserted into and spring-biasedly installed to the base member movably in a direction rectangular to the axis of the adjusting pipe, and a locking piece, having locking teeth to engage with the engaging teeth locking the adjusting pipe along the axis when fixed with the base member, the locking piece being installed so as to release the locking teeth from the engaging teeth by means of moving the adjusting piece when releasing from the base member.

Owing to this structure, in the present invention the length of the outer cable relative to the inner cable can be adjusted by axially moving the adjusting pipe. Such adjustment can be performed only when the locking piece is not fixed with the base member. After adjustment, the adjusting pipe is locked axially by fixing the locking piece with the base member.

Further, when released from fixation with the base member, the locking piece is urged towards the adjusting pipe by means of the adjusting piece which is spring-biased. When moving the adjusting piece against the spring-biasing direction, the locking piece becomes free of the adjusting pipe to release the engagement of the locking teeth with the engaging teeth, resulting in free movement of the adjusting pipe in the axial direction. In this case, movement of the adjusting piece against the spring-biasing is required only to correspond with the height of the engaging teeth, resulting in a very small adjusting piece stroke.

BRIEF DESCRIPTION OF THE DRAWINGS

The object and features of the present invention will become more readily apparent from the following detailed description taken in conjunction with the accompanying drawings in which:

FIGS. 8 and 9 are views similar to those of FIGS. 3 and 4, but showing different positions of the locking piece.

DETAILED DESCRIPTION OF THE PREFERRED EMBODIMENTS

Figure 1:
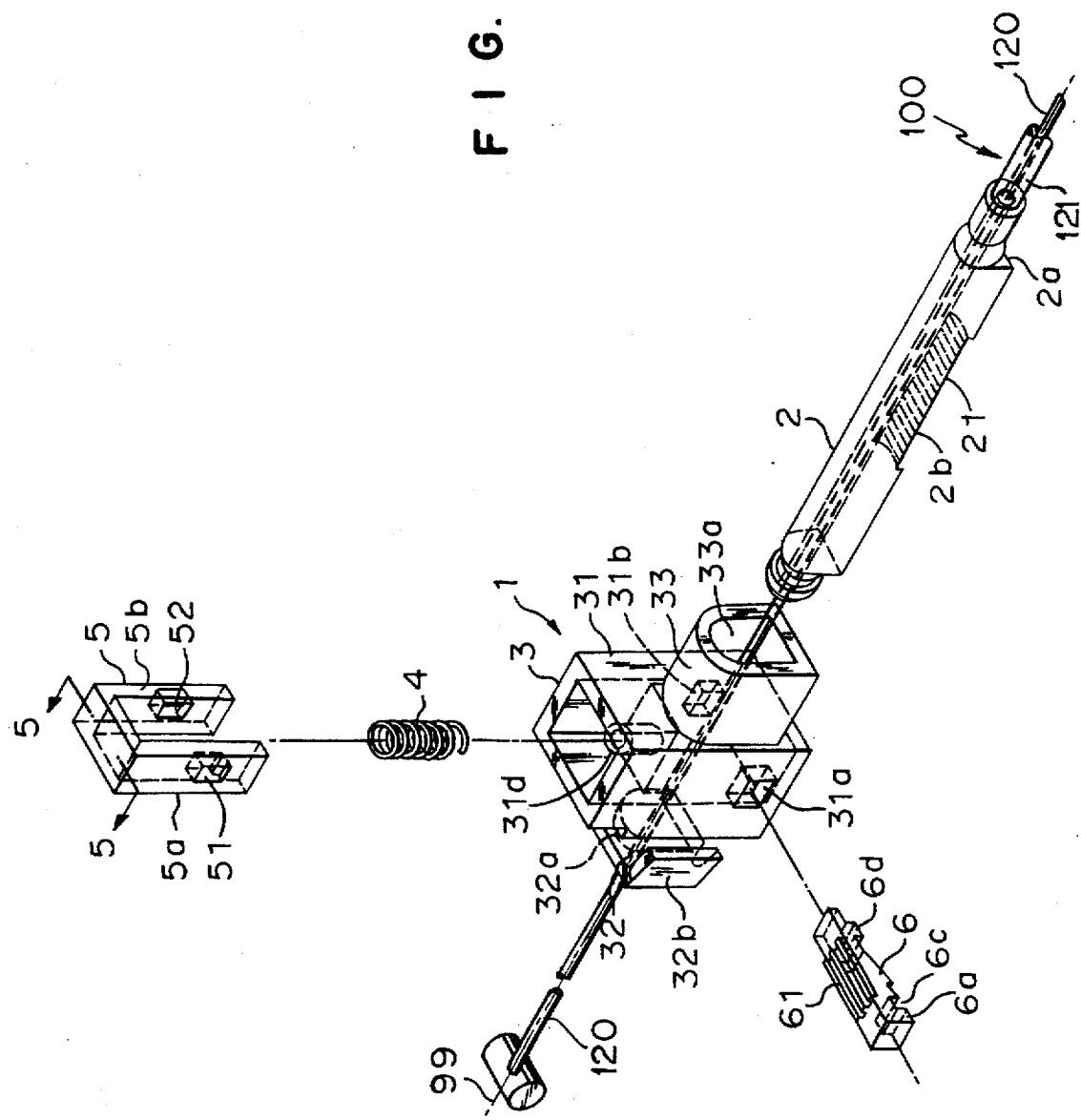
FIG. 1 is an exploded perspective view of the present invention.

The present invention is specifically described according to embodiments, as follows:

In FIG. 1, a length-adjusting device for a control cable 1 comprises, in summary:

an adjusting pipe 2 being passed by an inner cable therethrough, secured firmly to an outer cable, a base member 3 through which the adjusting pipe 2 is inserted movably along the axis thereof, an adjusting piece 5, inserted into the base member 3 movably in a direction rectangular to the axis of the adjusting pipe 2, being installed with a spring-biasing mechanism built therein, and a locking piece 6, installed so as to pass through both the base member 3 and the adjusting piece 5, in such a manner as to be movable in directions rectangular to both the moving direction of the adjusting piece 5, and the axis of said adjusting pipe 2.

As depicted in FIG. 1, the adjusting pipe 2 is shaped nearly as a half-cylinder with a flat bottom 2a, about the center of which a concave 2b is axially cut, the concave 2b having engaging teeth on the bottom, perpendicular to the axis thereof.

Figure 2:
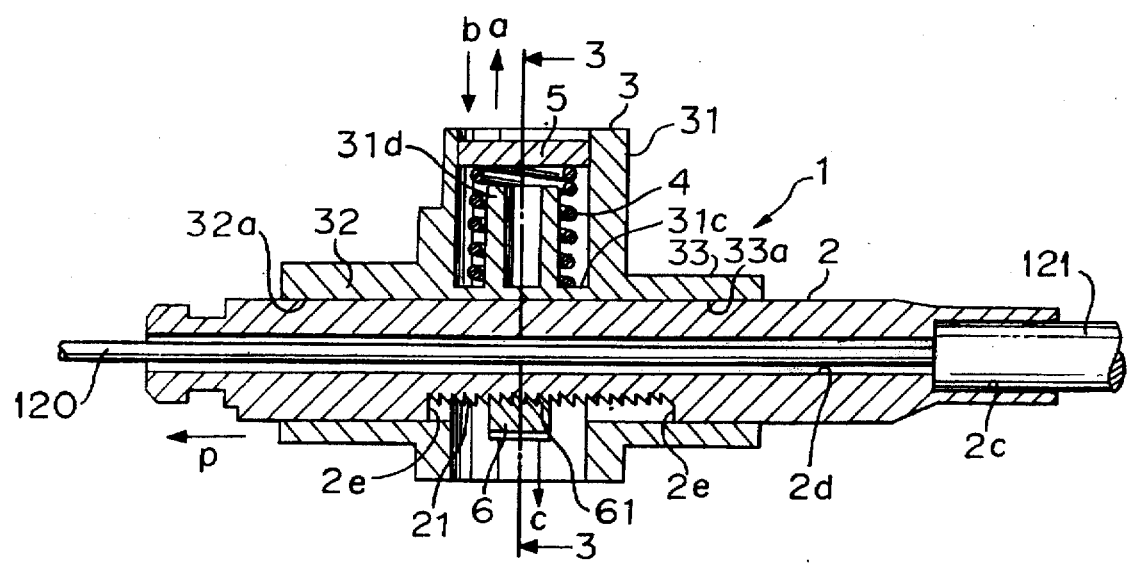
FIG. 2 is a longitudinally sectional view of the present invention is an assembled state according to FIG. 1.

As depicted in FIGS. 2 and 8, a stepped through-hole is formed around the axis of the adjusting pipe 2, having a large diameter portion 2c and a small diameter portion 2d coaxially, an outer cable attached to the large diameter portion 2c, and an inner cable passed through said small diameter portion 2d.

The base member comprises a square/rectangular pipe portion 31 positioned at the center thereof, having guide tubes 32, 33 connected to a pair of opposite side walls thereof, as well as square/rectangular openings (31a, 31b) on the other pair of opposite side walls thereof, respectively.

In the square/rectangular pipe (31), a spring seat 31c, having a cylindrical projection 31d, is installed with both ends thereof connected to the side walls of the square pipe and guide holes 32a, 33a having a half-cylinder shape in correspondence with the external cross section of said adjusting pipe 2 are provided through the guide tubes 32, 33 (Cf. FIG. 2). Thus, between both ends of the spring seat 31c and the other side walls of the square rectangular pipe 31, there are slits formed to receive insertion of the leg portions of the adjusting piece 5.

In the guide cylinder 32, a resilient tongue portion 32b is installed at the tip thereof, so that the base member 3 is secured to a stationary member by means of inserting the tongue portion 32b into a square concave of the stationary member.

Figure 5:
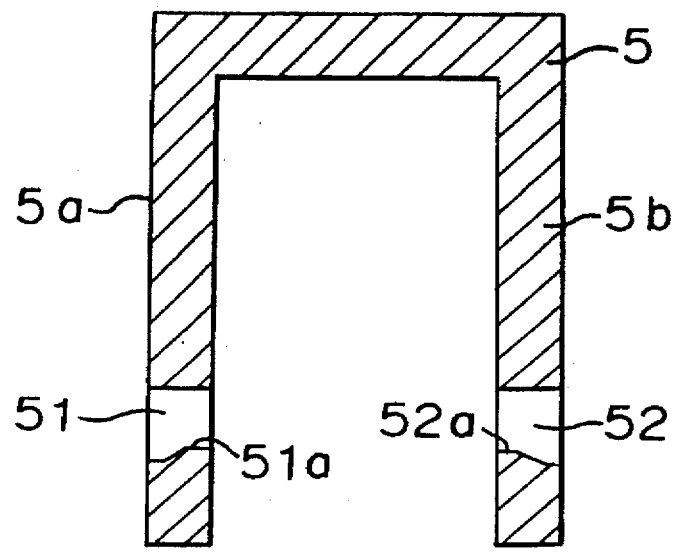
FIG. 5 is a sectional view of an adjusting piece along line 5—5 in FIG. 1.

As shown in FIG. 1, the adjusting piece 5 is formed in a shape, making the opposite side walls form leg portions 5a, 5b. In leg portions 5a, 5b, square/rectangular holes 51, 52 are formed, wherein, as shown in FIG. 5, raised stepped portions 51a, 51b are formed with slopes, respectively.

Figure 6:
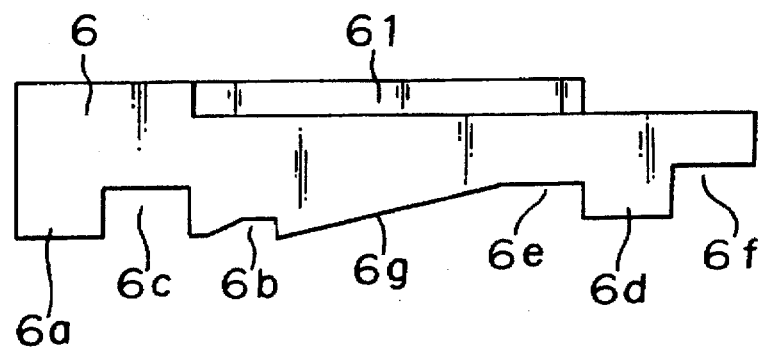
FIG. 6 is an enlarged side view of an adjusting piece in FIG. 1.
Figure 7:
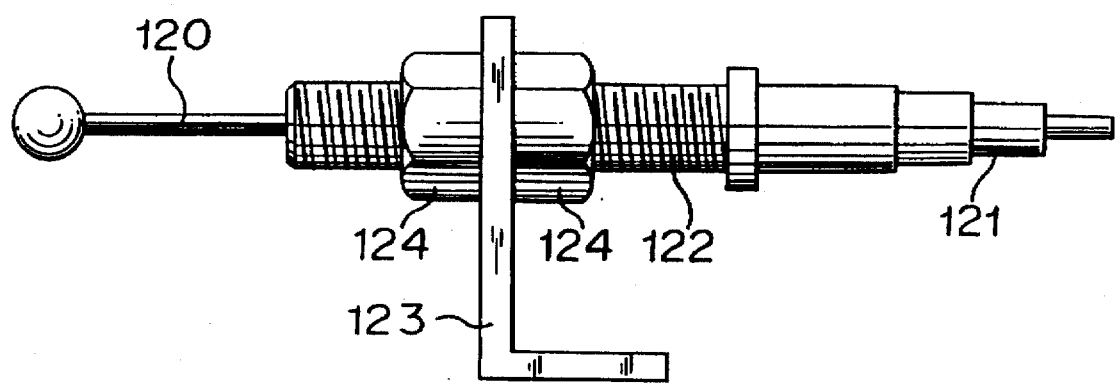
FIG. 7 is a front view of a length-adjusting device pursuant to prior art.

The locking piece 5 comprises a square member, with locking teeth 61 formed on the upper surface thereof, having various concavities and convexes on the back surface, said locking teeth being formed as parallel teeth disposed lengthwise along the square member. As shown in FIG. 6, at one end portion of the square member (left side in FIG. 6), a locking projection 6a is formed so as to engage into the square/rectangular opening 31a of the base member, and a concavities 6b is formed to correspond to the projection 51 of the square/rectangular hole 51 of the adjusting piece 5, and a concavities 6c is formed between the locking projection 6a and the concavities 6b to have enough width to receive the square opening 31a and the outer wall of the square/rectangular hole 51. Formed at the other end of the square member (right side in FIG. 6) are a locking projection 6d so as to insert into the square/rectangular opening 31b of the base member 3, a concavities 6e and a cutout 6f formed at one side of the locking projection 6d, with slope 6g of a concavity 6e between the concavity 6b and "bottommost wall/surface" of the concavity 6e.

Figure 3:
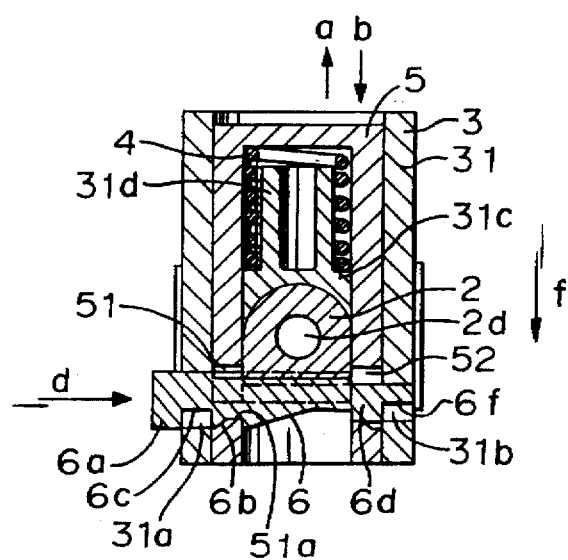
FIG. 3 is a sectional view along line 3—3 in FIG. 2.

All members and pieces formed as above are assembled in the manner depicted in FIGS. 2 and 3.

Namely, the adjusting pipe 2 is assembled unpivotably but movable in an axial direction into the base member (3) by inserting it into the guide holes 32a, 33a of the guide tubes 32, 33.

The adjusting piece 5 is mounted to the base member 3 movably in the direction rectangular to the axis of the adjusting pipe 2, by inserting leg portions 5a, 5b into the slits at both sides of the spring seat 31c after closely mounting the spring 4 around the cylindrical projection 31d of the spring seat 31c. The adjusting piece 5, thus mounted, is engaged in direction a in FIG. 2 by means of the spring 4.

The locking piece 6 is inserted into the square/rectangular openings and holes 31a, 31b, 51 and 52 after mating the openings 31a, 31b with the corresponding holes 51, 52, when urging the adjusting piece 5 in direction b in FIG. 2. After thus inserting, the locking projection 6a of the locking piece 6 is positioned outside the base member 3, and the concavities 6c, 6b are positioned at the square/rectangular opening 31a and hole 51, respectively. In addition, the other locking projection 6d and the cutout 6f are at the square/rectangular hole 52 and opening 31b, respectively, the locking piece 6 piercing through the base member 3 and the adjusting piece 5, as shown in FIG. 3. In this state, the adjusting piece 5 is prevented from slipping off the base member 3, despite the urging force of the spring 4, and the locking teeth 61 of the locking piece 6 are biased toward the adjusting pipe, resulting in engagement with the engaging teeth 21 (Cf. FIG. 2). In this case, the concavity 6c and cutout 6f of the locking piece 6 are positioned at the square openings 31a and 31b, respectively, with clearances therebetween, making the locking piece 6 movable. Consequently, the locking teeth 61 can be released from the engaging teeth 21, by urging the adjusting piece 5 in direction b to make the locking piece 6 free from the adjusting pipe 2, leading to free movement of the adjusting pipe 2 relative to the base member 3.

In this embodiment, since the engaging teeth 21 are, as depicted by FIG. 2, formed like saw teeth, the adjusting piece moves toward direction c against the urging force of the spring 4 by pushing the adjusting pipe toward direction p, making the engaging teeth 21 advance over the locking teeth 61, resulting in free movement of the adjusting pipe 2 toward direction p as far as the pushing force is applied. However, in this case, the adjusting pipe 2 is unable to advance against direction p because of the engagement of the engaging teeth 21 with the looking teeth 61.

As regards movement and locking of the adjusting pipe 2, the shape of the engaging and locking teeth 21, 61 is essential. Namely, when shaping those teeth toward the contrary direction, the adjusting pipe 2 can move toward the counter direction only, and when shaping them in a symmetrical zigzag profile, as shown in FIG. 8 the adjusting pipe 2 can move toward both directions.

In these cases, movement of the adjusting pipe 2 is restrained by means of abutting end walls 2e, 2e of a concave portion 2b, in which the engaging teeth are formed, to the opposite side walls of the locking piece 6.

Next, the operations and functions of the length-adjusting device 1 are described as follows:

In the device 1, the base member 3 is made stationary by engaging the resilient tongue 32b of the guide tube 32 on the base member 3 into an opposite stationary member (not depicted), with the locking piece 6 being disposed at the position shown in FIG. 3. Then, the locking teeth 61 are released from the engaging teeth 21, and during such release, the length of a control cable can be adjusted by axially moving the adjusting pipe 2. Besides, even when the adjusting piece is engaged, similar adjustment can be exerted by moving the adjusting pipe toward direction p (Cf. FIG. 2). After adjustment, releasing the load toward direction b, the locking piece 6 is urged in direction d (Cf. FIG. 3) making the locking projections (6a, 6d) engage into the square openings 31a, 31b, respectively.

Figure 4:
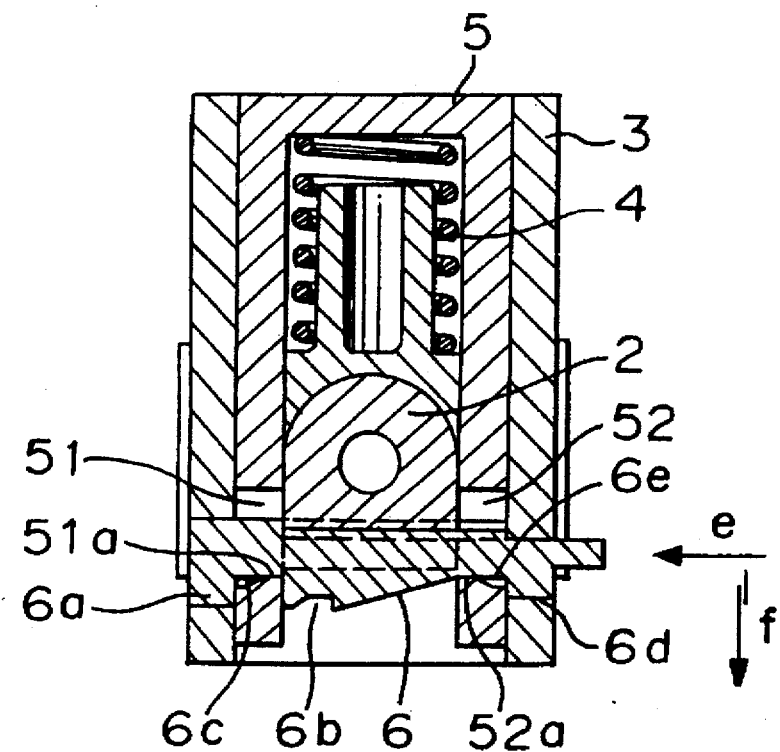
FIG. 4 is a sectional view of a locked state along line 3—3 in FIG. 2.

In this state (Cf. FIG. 4), the locking piece 6 is locked, as respects movement toward the same direction as the direction of movement of the adjusting piece 5, with the locking teeth 61 being engaged with the engaging teeth 21, resulting in locking and maintaining the adjusting pipe 2 at the adjusted position.

For readjusting, the adjusting piece 5, being locked as shown in FIG. 4, is pushed toward direction b to make the square/rectangular holes 51, 52 mate with the square/rectangular openings 31a, 31b, respectively, and then, pushing the locking piece 6 toward direction e, engagement of the locking projections 6a, 6d with the square/rectangular openings 31, 31b is released, resulting in the original state (Cf. FIG. 3). Under such conditions, adjustment can be performed as aforementioned.

As mentioned above, double operations, i.e., both on adjusting piece 5 and on locking piece 6, are necessary for release from the locking state, leading to the attainment of a high degree of safety due to the prevention of unexpected release caused by inadvertant contact.

In the present invention, locking is achieved by means of engagement between the locking teeth and engaging teeth which are both parallel teeth, resulting in secure locking without any adverse or troubled functions. At the same time, since such engagement can be released by means of pushing the locking teeth only just down from the engaging teeth, small movement of the adjusting piece is satisfactory, so that the device of the present invention can even be installed in narrow spaces.

In addition, lock release for adjustment and locking after adjustment can be carried out easily and simply by one-touch operation comprising movements of the adjusting piece and the locking piece (engagement into the base member), respectively. Moreover, the whole device itself can be easily assembled because of the small number of parts, comprising, approximately, a base member, an adjusting piece, an adjusting pipe, a spring and a locking piece.

What is claimed is:

1. A length-adjusting device for a control cable comprising:

an adjusting pipe (2) to which an outer cable (121) is fixed, with an inner cable (120) passing therethrough, said adjusting pipe (2) having engaging teeth (21) formed rectangular to the axis and outside thereof;

a base member (3) having a pair of guide tubes (32, 33) for supporting said adjusting pipe (2);

a square pipe portion (31), having opposed side walls, provided on said base member (3);

a pair of square openings (31a, 31b) respectively provided on said opposed side walls of said square pipe portion (31) of said base member (3);

an adjusting piece (5), having leg portions (5a and 5b), inserted in said square pipe portion (31) of said base member (3) in a direction perpendicular to the axis of said adjusting pipe (2), and said adjusting piece (5) being biased by a spring (4);

a pair of square holes (51 and 52) formed in said leg portions (5a and 5b) of said adjusting piece (5);

a locking piece (6) penetrating through said pair of square openings (31a, 31b) of said base member (3) and said pair of square holes (51, 52) of said adjusting piece (5); said locking piece (6) having locking teeth (61) engaging with engaging teeth (21) of said adjusting pipe (2), and locking projections (61, 6d) and concavities (6c, 6e) formed on said locking piece (6), said locking projections (6a, 6d) engaged respectively to said square openings (31a, 31b) of said base member (3), and said locking piece (6) being locked by inserting respectively outer walls of said square holes (51, 52) into said concavities (6c, 6e), and said locking piece (6) locking said adjusting pipe(2).

2. A length-adjusting device for a control cable according to claim 1, wherein:

said locking piece (6) is able to be placed both in a first position locking said adjusting pipe (2) and in a second position enabling said adjusting pipe (2) to move towards the axial direction thereof, said square holes (51, 52) of said adjusting piece (5) being engaged with said concavity (6b) and said locking projection (6d) of said locking piece (6) and said locking (61) of said locking piece (6) being engaged with said engaging teeth (21) of said adjusting pipe (2); and when said adjusting piece (5) is urged against said spring (4), the outer walls of said square openings (41a, 31b) of said base member (3) move into said concavity (6c) and said cut off (6f) of said locking piece (6), and said locking teeth (61) of said locking piece (6) moves apart from said engaging teeth (21) of said adjusting pipe (2).

* * * * *